Patented Aug. 30, 1949

2,480,810

UNITED STATES PATENT OFFICE 2,480,810

INTERPOLYMERS OF ACRYLAMIDES AND ALLYL ACETO-ACETATES AND PROCESS OF PRODUCING SAME

Giffin D. Jones, Easton, Pa., assignor to General Aniline & Film Corporation, New York, N. Y., a corporation of Delaware No Drawing. Application May 2, 1947,
Serial No. 745,650

6 Claims. (Cl. 260—86.1)

This invention relates to novel interpolymers of amides of $\alpha,\beta$-ethylenically unsaturated monocarboxylic acids with a $\beta,\gamma$-ethylenically unsaturated lower aliphatic alcohol ester of acetoacetic acid.

I have found that by interpolymerizing a mixture of an amide of an $\alpha,\beta$-ethylenically unsaturated monocarboxylic acid with a $\beta,\gamma$-ethylenically unsaturated lower aliphatic alcohol ester of acetoacetic acid in the manner customary in forming interpolymers of vinyl compounds, it is possible to produce novel water-soluble interpolymers which yield clear viscous solutions and which are quite useful in the art.

The details of the present invention will be apparent from a consideration of the following specific example of a preferred embodiment thereof. The parts are by weight.

Example

A mixture of 10 parts of acrylamide and 2 parts of allyl acetoacetate dissolved in 16 parts of methanol was placed in a glass container and the container sealed under an atmosphere of nitrogen. The reaction vessel was then exposed to ultraviolet light for 20 hours, during which time the interpolymer was formed. The container was then opened and the acrylamide/allyl acetoacetate interpolymer was isolated by filtration and then dried.

Treatment of 25 parts of a 10% aqueous solution of the interpolymer with 2 parts of a 2% aqueous solution of adipodihydrazide, which had been acidified with a small amount of acetic acid, yielded a thermal reversible gel which had a melting point of 55° C. and a setting point of 42° C.

Interpolymers prepared in a similar manner from mixtures of acrylamide and allyl acetoacetate, in which the percentage of allyl acetoacetate was greater than 30%, on treatment with adipodihydrazide, gave gels which melted below room temperature.

It will be understood that the foregoing example is illustrative of a preferred embodiment of this invention and that various permissible changes will suggest themselves to those skilled in the art. Thus, other $\beta,\gamma$-ethylenically unsaturated lower aliphatic alcohol esters of acetoacetic acid and amides of other $\alpha,\beta$-ethylenically unsaturated monocarboxylic acids may be used in place of the allyl acetoacetate and acrylamide specified in the example, while still obtaining novel interpolymers of generally similar properties, which will, of course, correspond chemically to the specific reactants employed in their production. For instance, other $\beta,\gamma$-ethylenically unsaturated lower aliphatic alcohol esters of acetoacetic acid of the general formula:

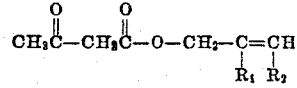

wherein $R_1$ is hydrogen, methyl or halogen, preferably chlorine, and $R_2$ is hydrogen or methyl, may be employed in place of the allyl acetoacetate specified. Examples of such acetoacetic acid esters of $\beta,\gamma$-ethylenically unsaturated lower aliphatic alcohols which can be interpolymerized with the acrylamides mentioned above include, in addition to allyl acetoacetate, crotyl acetoacetate, methallyl acetoacetate and $\alpha$-chloroallyl acetoacetate. Likewise, in place of the acrylamide specified in this example the amides of other $\alpha,\beta$-ethylenically unsaturated monocarboxylic acids of the formula:

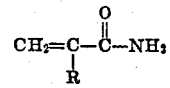

where R is hydrogen, lower alkyl, preferably methyl or halogen, preferably chlorine, may be employed. Examples of amides of this type which can be employed for the preparation of the products of this invention include, in addition to acrylamide, methacrylamide, $\alpha$-chloroacrylamide, $\alpha$-fluoroacrylamide and $\alpha$-bromacrylamide.

As indicated by the above example, the interpolymerization may advantageously be carried out in the presence of an inert solvent and in place of the methanol specified in the example other inert solvents may be employed. Examples of suitable solvents include lower aliphatic alcohols (i. e. ethanol, propanol, etc., in addition to methanol); also the lower aliphatic ethers, such as diethyl ether, diisopropyl ether, diisobutyl ether, di-n-butyl ether, dioxane; the aliphatic, cycloaliphatic and aromatic hydrocarbons, e. g. propane, the butanes, the pentanes, the hexanes, the heptanes, the octanes, etc. and mixtures thereof, cyclohexane, methyl-cyclohexane, benzene, toluene, xylene; dimethylformamide and pyridine.

I have found that the polymerization techniques commonly employed for the polymerization of acrylamide are effective for the production of the novel interpolymers of this invention and the polymerization may readily be carried out either in a solution as above described or using emulsion polymerization techniques and employing, if desired, peroxide-type polymerization catalysts in place of the ultra-violet light specified in the example. Thus, the novel interpolymers of the present invention have been produced by subjecting a mixture of 10 parts of acrylamide and 2 parts of allyl acetoacetate in 10 parts of water to the action of ultra-violet light. It was found that the allyl acetoacetate was soluble due to the presence of acrylamide and a stiff gel was formed which, however, was not thermo-reversible. This gel was then diluted to 5% aqueous solution while stirring with the addition of water and on treatment with adipodihydrazide formed a thermo-reversible gel.

The novel interpolymers of this invention possess an acetoacetic acid group which substantially modifies the properties of the resin and renders them useful in a variety of applications. Thus, the presence of the acetoacetic acid group in the resins produced in accordance with this invention enables them to act as a non-diffusible color coupling component for the formation of yellow azomethine dyes in certain types of color photography processes and useful resins have been obtained when the relative amount of the unsaturated alcohol acetoacetic acid ester employed in forming the interpolymers was varied from about 1% to about 40%, based on the weight of acrylamide. However, these novel interpolymers have been found to be particularly valuable for the production of thermo-reversible gels by treatment with a polyhydrazide as disclosed in my copending application Serial No. 745,651, filed May 2, 1947, and when interpolymers which are useful for this purpose are desired I prefer to use from about 5% to 30% of the unsaturated alcohol acetoacetic acid ester, based on the weight of the acrylamide, or its equivalent, in their formation, since when less than 5% of the esters are employed an excessive amount of gelling agent (polyhydrazide) must be employed to form a thermo-reversible gel while when more than 30% of the ester is employed in the polymerization process the resultant polymers form gels which melt below room temperature and thus would have relatively little utility in photography as a gelatin substitute.

I claim:

1. The interpolymers of an amide of an $\alpha,\beta$-ethylenically unsaturated monocarboxylic acid of the formula:

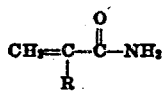

wherein R is a member of the group consisting of hydrogen, halogen and methyl, with from 1-40% by weight thereof of a $\beta,\gamma$-ethylenically unsaturated lower aliphatic alcohol ester of acetoacetic acid said ester having the formula:

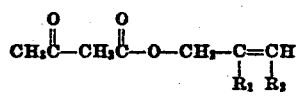

wherein $R_1$ is a member of the group consisting of hydrogen, halogen and methol, and $R_2$ is a member of the group consisting of hydrogen and methol.

2. The interpolymer of acrylamide with from 1-40% by weight thereof of allyl acetocetate.

3. The method of interpolymerizing an amide of an $\alpha,\beta$-ethylenically unsaturated monocarboxylic acid of the formula:

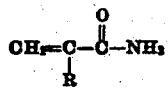

wherein R is a member of the group consisting of hydrogen, halogen and methyl, with from 1-40% by weight thereof of a $\beta,\gamma$-ethylenically unsaturated lower aliphatic alcohol ester of acetoacetic acid said ester having the formula:

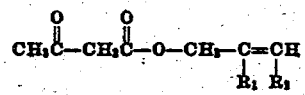

wherein $R_1$ is a member of the group consisting of hydrogen, halogen and methyl, and $R_2$ is a member of the group consisting of hydrogen and methyl which comprises subjecting a mixture thereof to the action of a known polymerization catalyst for acrylamide.

4. The method of interpolymerizing acrylamide with from 1-40% by weight thereof of allyl acetoacetate which comprises subjecting a mixture thereof to the action of a known polymerization catalyst for acrylamide.

5. The interpolymer of acrylamide with from 5-30% by weight thereof of allyl acetoacetate.

6. The interpolymers of an amide of an $\alpha,\beta$-ethylenically unsaturated monocarboxylic acid of the formula:

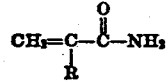

wherein R is a member of the group consisting of hydrogen, halogen and lower alkyl radicals, with from 5-30% by weight thereof of a $\beta,\gamma$-ethylenically unsaturated lower aliphatic alcohol ester of acetoacetic acid said ester having the formula:

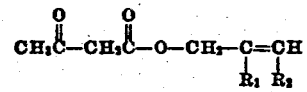

wherein $R_1$ is a member of the group consisting of hydrogen, halogen and methyl, and $R_2$ is a member of the group consisting of hydrogen and methyl.

GIFFIN D. JONES.

REFERENCES CITED

The following references are of record in the file of this patent:

UNITED STATES PATENTS

| Number | Name | Date |
|---|---|---|
| 2,164,188 | Grell et al. | June 27, 1939 |